United States Patent Office 2,780,071
Patented Feb. 5, 1957

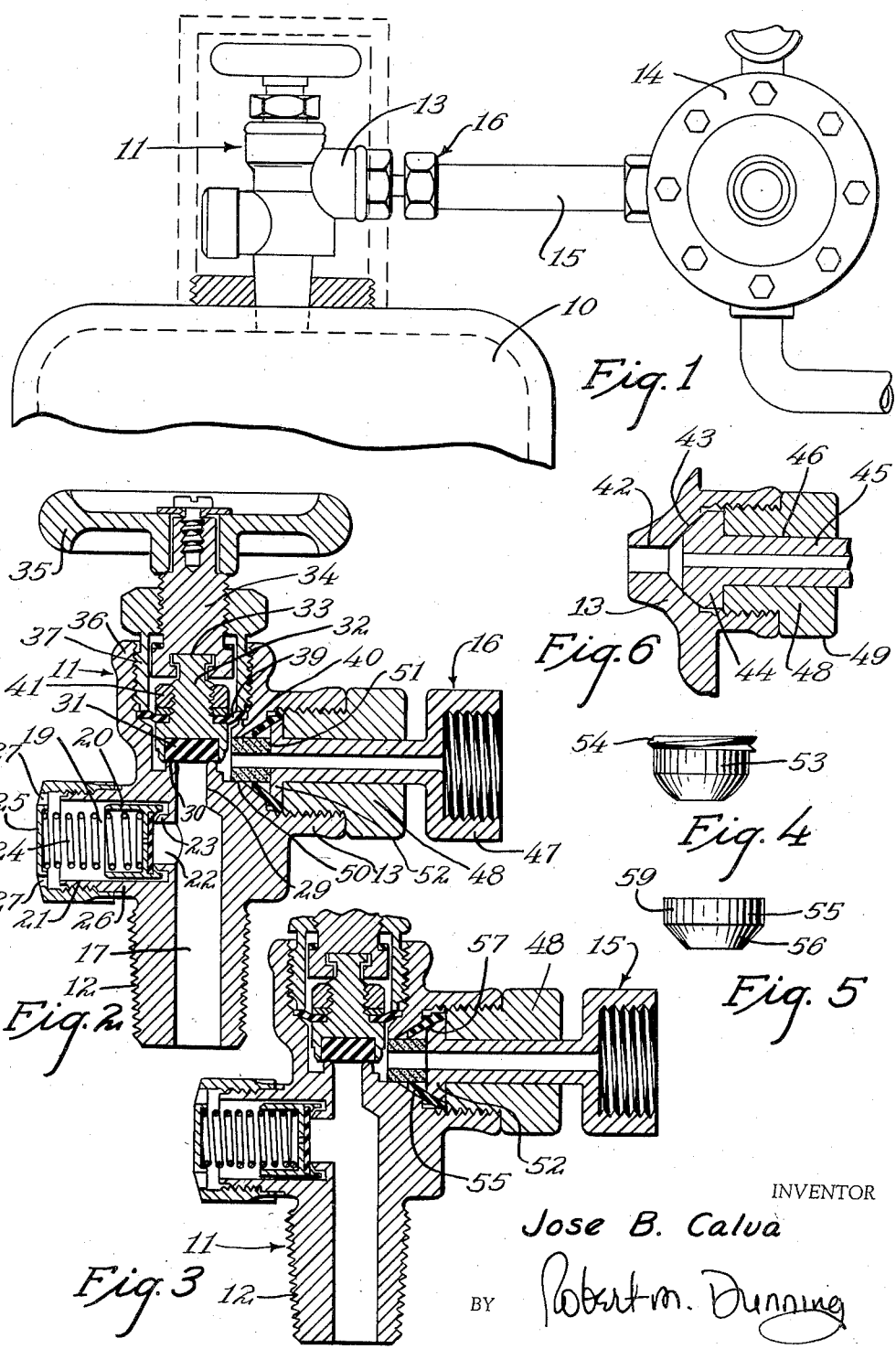

2,780,071

VALVE STRUCTURE FOR USE IN CONJUNCTION WITH GAS ODORANT SYSTEMS

Jose B. Calva, Minneapolis, Minn., assignor of one-half to George W. Benz, St. Paul, Minn.

Application October 29, 1952, Serial No. 317,427

7 Claims. (Cl. 62—1)

This invention relates to an improvement in the valve structure for use in conjunction with gas odorant systems and deals particularly with a means of modifying existing valve structures to permit an odorant cartridge to be used in conjunction therewith.

In previously filed applications I have described the process of odorizing gas through the use of an odorant cartridge placed in the high pressure zone of a gas system. The cartridge is particularly designed for use in conjunction with liquefied petroleum gases which are normally contained in cylinders and detachably connected to the gas system of a house or building. In my previous applications I have proposed to provide an adapter designed for attachment to the control valve of the gas tank for containing the odorant cartridge. I have also disclosed a special type of valve designed to contain the odorant cartridge. An object of the present invention lies in a manner of changing existing equipment in order to accommodate the cartridge.

Another feature of the present invention lies in the provision of a tapered ring which is designed to seat against the connector seat in a threaded cavity of the valve and against which the head of the connector engages. The walls of the adapter are parallel when viewed in section so that the adapter ring may fit between the connector and its seat.

A further feature of the present invention resides in the provision of an adapter which conserves space by cutting down the size of the head of the connector rather than the threaded part thereof. The head of the connector is normally of substantial length. However, the length of this head is of relative unimportance as the head seats against a tapered portion of the valve. By cutting down the length of this head, space is provided for the accommodation of the adapter ring between the connector head and the valve cavity seat without changing the length of the threaded portion of the connector.

An added feature of the present invention lies in the provision of an adapter which may be provided with an odorant cartridge connected thereto. In one form of constrction the adapter ring encircles the odorant cartridge and supports the same so that the two parts may be handled as a unit.

Still another feature of the invention resides in the provision of an adapter which may have a single thread or portion of a thread encircling the same. When the adapter is constructed in this way it may be threaded into place and the connector may be threaded into the opening against the adapter.

These and other objects and novel features of the invention will be more clearly and fully set forth in the following specifications and claims.

Figure 1 is an elevation view of the upper portion of a gas tank showing the control valve in position thereupon.

Figure 2 is a sectional view through a valve showing the adapter in place therein.

Figure 3 is a view similar to Figure 2 showing a modified form of adapter.

Figure 4 is a side view of the adapter illustrated in the valve of Figure 2.

Figure 5 is a side view of the adapter illustrated in Figure 3.

Figure 6 is a sectional view through a portion of the valve such as those shown in Figures 2 and 3 of the drawings before modification thereof.

The invention is particularly useful in conjunction with a tank of liquefied petroleum gas, such a tank being indicated by the numeral 10 in the drawings. The tanks are usually provided with a valve indicated in general by the numeral 11, these valves being provided at one end with a threaded shank 12 which engages into the tank. The valve 11 is provided with an outlet 13 which is normally connected to a pressure regulating valve 14 by a suitable conduit 15. A connector indicated in general by the numeral 16 connects the conduit 15 with the valve 11.

The valve 11 is of a conventional type with the exception of one modification. The valve includes an inlet passage 16 extending through the threading shank 12 and leading to an emergency pressure release valve 19. The pressure release valve includes a piston 20 which is slidable in a cylinder 21, one end of which is provided with a reduced diameter passage 22 connected to the passage 17. The piston 20 is normally urged against a valve seat 23 encircling the passage 22 by a spring 24 which is held in place by a cap 25. The cap 25 is provided with internal threads which engage the external threads of the laterally extending boss 26 through which the cylindrical bore 21 extends. The cap 25 is apertured as indicated at 27 to permit escape of the gas in the event the pressure within the tank exceeds the maximum.

The passage 17 communicates at its upper end with a reduced diameter passage 29 which terminates in a valve seat 30. A circular valve member 31 is supported in a valve piston 32 which is detachably connected at 33 with a threaded valve stem 34. The valve stem 34 is provided with a hand wheel by means of which the valve may be moved vertically.

The valve body 11 is provided with an upwardly projecting sleeve 36 which is axially aligned with the passage 29 and the valve plunger 32. An externally threaded sleeve 37 is threaded into the sleeve 36 and acts as a means of clamping a diaphragm 39 against a shoulder 40 within the body of the valve 11. The diaphragm 39 is centrally apertured to accommodate the upper end of the valve plunger 32 and a clamping nut 41 is threaded onto the valve plunger to form a means of clamping the diaphragm to the valve plunger. The diaphragm forms a seal between the upper and lower portions of the valve.

The outlet member 13 includes an outlet passage 42 which is normally of relatively small diameter as illustrated in Figure 6 of the drawing. This passage leads toward a tapered surface 43 which forms a seat against which the connector may engage. As shown in Figure 6 the connector includes a connected head 44 and a tapered outer surface which is inclined at the same angle as the tapered seat 43 and is designed to form a seal thereagainst. The head 44 is of larger outer diameter than the adjoining tubular portion 45 of the connector which is integral with, or sealed to, an internally threaded socket 47.

An externally threaded sleeve 48 is slidable upon the tubular member 46 and includes a rectangularly surfaced nut 49 by means of which the sleeve may be threaded into the internally threaded end of the outlet 13. The threaded socket 47 is designed to accommodate the externally threaded portion at the end of the conduit 15 to form a seal therewith.

In modifing the valve from the form illustrated in Figure 6, the passage 42 is preferably increased slightly in diameter as shown in Figures 2 and 3. This forms a cylindrical recess 50 of sufficient size to accommodate the cartridge 51 which possesses capillary properties toward the odorant. This is the only modification required in the body of the valve.

As also shown in Figure 2 of the drawing, in modifying the valve the end of the connector head is cut off to form an end of relatively short length as indicated at 52. By cutting down the length of the connector head 52 a space is provided forwardly of the connector head and externally of the cartridge to accommodate a tapered adapter ring 53.

The adapter ring 53 comprises a ring shaped body having a frusto-conical outer surface and a frustro-conical inner surface. The tapered outer surface is of proper shape to fit snugly against the tapered seat 43 of the valve while the tapered inner surface is of proper shape to fit snugly against the tapered head 52 of the connector. Thus the adapter is merely sandwiched between the end of the connector and its seat and the threaded engagement between the sleeve 48 and the outlet 13 remains substantially unchanged.

As indicated in Figures 2 and 3 of the drawing the adapter ring may include an extremely short threaded portion 54 which is engageable in the internally threaded valve outlet 13 to fit against the tapered seat 43. This threaded portion normally comprises a single thread so that a minimum of space is employed. Usually the internal threads of the outlet 13 are slightly longer than necessary and the adapter may be threaded into the outlet without taking space normally employed by the threaded sleeve 48.

The construction illustrated in Figures 3 and 5 of the drawing is similar to that previously discussed with the exception that the threaded end 54 of the adapter is eliminated. The adapter 55 illustrated in Figures 3 and 5 includes an externally tapered frusto-conical outer surface 56 and a similarly shaped inner surface 57. A generally cylindrical surface 59 connects the inner and outer surfaces at the outer periphery of the adapter and the adapter merely fits between the tapered valve seat 43 and the tapered connector head 52.

The adapter ring may be connected to the outer surface of the odorant cartridge 51 by a suitable cement or other suitable means. It is possible that the cartridge be separate from the adapter ring but the combination of the two elements is preferable for ease in handling and insertion. When the cartridge is tubular in form as illustrated and is produced of sufficiently firm material, the cartridge may be merely placed into the adapter ring and held in place by friction. Either prior or subsequent to attachment with the adapter ring the cartridge 51 is subjected to odorant toward which it has capillary properties. The gas while flowing through the cartridge will pick up sufficient odor to be readily recognized upon escape.

In ordinary procedure the tank is filled with liquefied petroleum gas through the outlet 13 of the valve and the valve is then closed to prevent the escape of liquid. The odorant cartridge may then be inserted in position within the valve outlet and the outlet may be sealed by a plastic diaphragm or other suitable means. Upon delivery of the gas, the seal is removed and the outlet 13 is connected to the connector 52. The cartridge is thus supported in the gas stream at a point where the pressure equals or substantially equals the pressure within the tank.

It is also possible to apply the odorant cartridge to the valve at the time of delivery of the tank. In other words the sealed cartridge and adapter ring may be opened and inserted just before the tank is connected. The installation of the cartridge at the supply plant is believed preferable, however, in view of the chance of error in failing to install the odorant cartridge at the point of delivery.

In accordance with the patent statutes I have described the principles of construction and operation of my valve and connector construction, and while I have endeavored to set forth the best embodiment of my invention, I desire to have it understood that obvious changes may be made within the scope of the following claims without departing from the spirit of the invention.

I claim:

1. A valve connection designed for use in a gas odorizing system, the connection including a shut-off valve having an inlet, an outlet, and a valve element between said inlet and outlet, a tapered shoulder within said outlet, a connector including a tapered end designed to seat against said tapered shoulder, an adapter between said shoulder and said tapered end, said adapter including a ring shaped body having oppositely disposed tapered walls designed to fit against said shoulder and said tapered connector end respectively, and an odorant cartridge encircled by said adapter.

2. The structure described in claim 1 and including means securing said cartridge and adapted together.

3. The structure defined in claim 1 and in which the outer surface of the adapter is generally cylindrical in shape.

4. The structure defined in claim 1 and in which the outer periphery of the adapter is threaded and the valve outlet is internally threaded to accommodate the adapter.

5. For use in detectively odorizing the vapor of liquified petroleum gas by passing said vapor from a storage tank for the liquified gas and at substantially tank pressure through unobstructed passages in an odorant cartridge containing a capillarily held vaporizable odorant material; a valve member attachable to said tank for controlling release of said vapor, said valve member having an inlet, an outlet, and a valve element therebetween, and said valve member being characterized by having an enlarged diameter outlet passage, of a size just sufficient to contain said cartridge, between said valve mechanism and said outlet, said passage being accessible from said outlet for insertion therein of said odorant cartridge.

6. For use in detectively odorizing the vapor of liquified petroleum gas by passing said vapor from a storage tank for the liquified gas and at substantially tank pressure through unobstructed passages in an odorant cartridge of capillary material containing a capillarily held vaporizable odorant material, the combination of; a valve member attachable to said tank for controlling release of said vapor and having an inlet, a valve element, and an outlet comprising a frusto-conical seat for cooperatively engaging with a similarly frusto-conical connector, and said valve member being further characterized by containing a cavity extending from the tip of said frusto-conical seat and along the passage-way between said outlet and said valve element; and a frusto-conical adapter fitting between said seat and said connector, said adapter having an internal diameter equal to that of said cavity and forming therewith a passage-way accessible from the outlet end of a size just sufficient to contain said odorant cartridge.

7. For use in detectively odorizing the vapor of liquified petroleum gas by passing said vapor from a storage tank for the liquified gas and at substantially tank pressure through unobstructed passages in an odorant cartridge of capillary material containing a capillarily held vaporizable odorant material, the combination of: a valve member attachable to said tank for controlling release of said vapor and having an inlet, a valve element, and an outlet comprising a frusto-conical seat for cooperatively engaging with a similarly frusto-conical connector, and said valve member being further characterized by containing a cavity extending from the tip of said frusto-conical seat and along the passage-way between said outlet and said valve element; a frusto-conical adapter fitting between said seat and said connector, said adapter having an internal diameter equal to that of said cavity and forming therewith a passage-way accessible from the outlet and of a size just sufficient to contain said odorant cartridge; an odorant cartridge fitting within said passage-way; and removable sealing means temporarily sealing said outlet against loss of odorant.

References Cited in the file of this patent

UNITED STATES PATENTS

| | | |
|---|---|---|
| 597,024 | Schmitz | Jan. 11, 1898 |
| 598,662 | Huxley | Feb. 8, 1898 |
| 845,338 | Diall | Feb. 26, 1907 |
| 999,895 | Smart | Aug. 8, 1911 |
| 1,232,549 | Marks et al. | July 10, 1917 |
| 1,938,036 | Martin et al. | Dec. 5, 1933 |
| 2,053,006 | Noss | Sept. 1, 1936 |
| 2,098,119 | White | Nov. 2, 1937 |
| 2,255,161 | Gray | Sept. 9, 1941 |
| 2,275,310 | Nuttall | Mar. 3, 1942 |
| 2,322,617 | Dayhuff | June 22, 1943 |
| 2,355,550 | Nussbaum | Aug. 8, 1944 |
| 2,416,537 | Neiser | Feb. 25, 1947 |
| 2,577,654 | Gate | Dec. 4, 1951 |
| 2,666,297 | Skousgaard | Jan. 19, 1954 |